Patented Mar. 13, 1923.

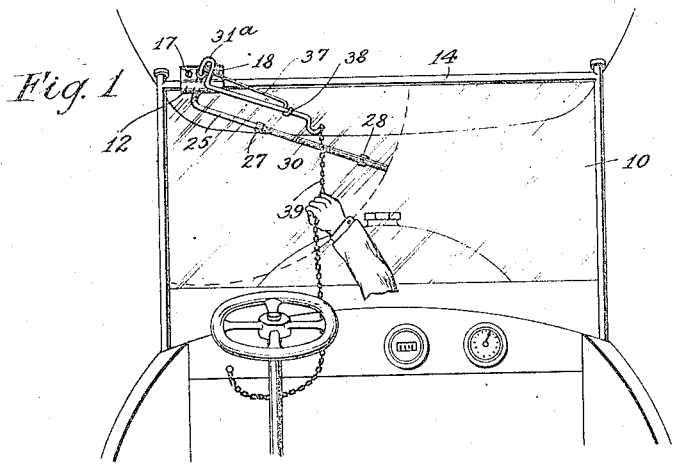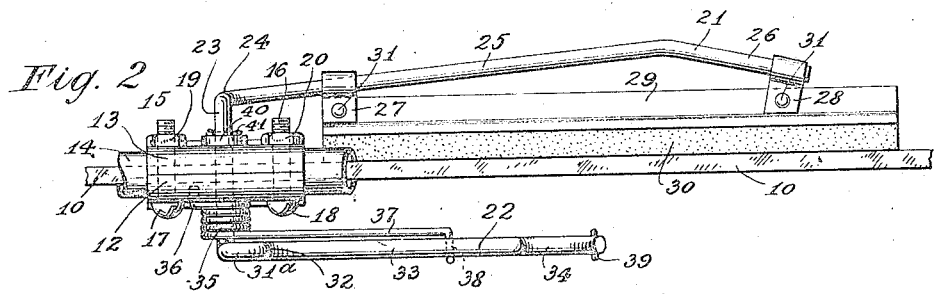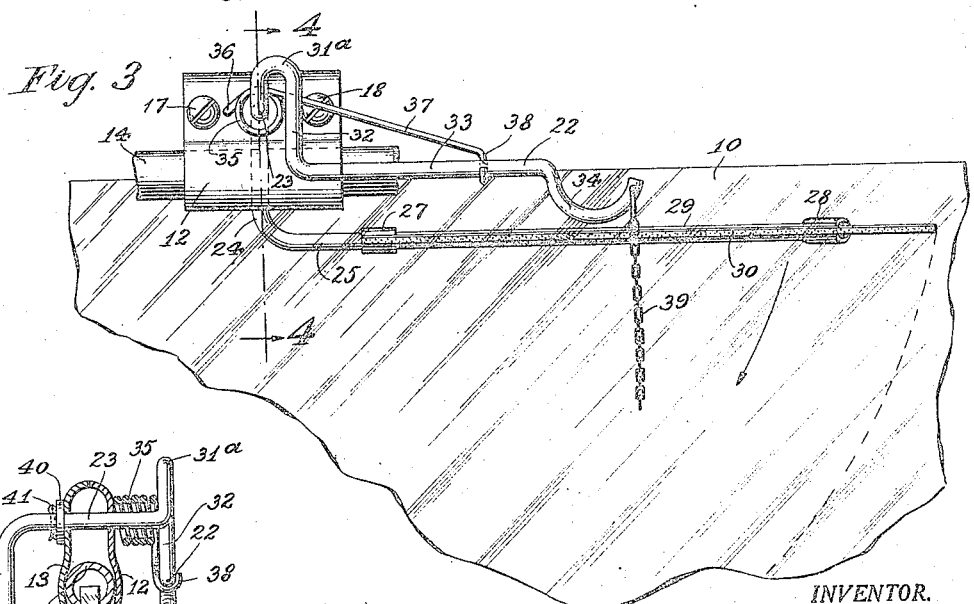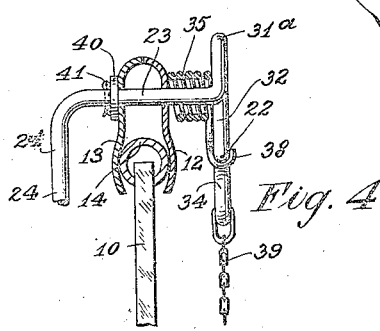

1,448,517

UNITED STATES PATENT OFFICE.

WILLIAM P. BRADY, OF NEW BRITAIN, CONNECTICUT, ASSIGNOR TO BRADY ELECTRIC & MANUFACTURING COMPANY, OF NEW BRITAIN, CONNECTICUT, A CORPORATION OF CONNECTICUT.

WINDSHIELD CLEANER.

Application filed October 25, 1922. Serial No. 596,771.

*To all whom it may concern:*

Be it known that I, WILLIAM P. BRADY, a citizen of the United States, and a resident of New Britain, county of Hartford and State of Connecticut, have invented certain new and useful Improvements in Windshield Cleaners, of which the following is a specification.

This invention relates to windshield cleaners for automobiles, and more particularly to an improved form of semi-automatic windshield cleaner for removing moisture from the front of the windshield.

One object of the invention is to provide a device of this nature which will enable the driver to keep the windshield clean with a minimum of effort.

A further object is to provide a semi-automatic windshield cleaner having operating means located within easy reach of the driver.

A further object is to provide a windshield cleaner having means for automatically returning the wiper arm to normal position after it has been manually operated by the driver.

A further object is to provide a device of this nature which will be simple, cheap to manufacture, easy to manipulate, and very efficient and durable in use.

With these and other objects in view, there has been illustrated on the accompanying drawings one form in which the invention may be conveniently embodied in practice.

Fig. 1 represents a rear elevational view, with parts broken away, of the front part of an automobile having the improved windshield cleaner applied thereto.

Fig. 2 is a top plan view with parts broken away of the windshield cleaner, and a portion of the windshield.

Fig. 3 is a rear elevational view of the windshield cleaner and windshield shown in Fig. 2.

Fig. 4 is an end view, partly in section, of the windshield cleaner and windshield, taken along the line 4—4 of Fig. 3, looking in the direction of the arrows.

Referring now to the drawings in which like reference numerals denote corresponding parts throughout the several views, the numeral 10 indicates the windshield of an automobile to which the invention has been applied. The improved windshield cleaner, as herein illustrated, includes a clamping bracket consisting of a pair of opposed jaws 12 and 13, said jaws having their upper ends abutting and having their lower ends clamped about the upper frame 14 of the windshield 10. The jaws 12 and 13 are adjustably secured together by a pair of bolts 15 and 16 having heads 17 and 18 located on the outside of the jaw 12, and having nuts 19 and 20 on the outside of the jaw 13. The above construction permits the device to be secured to the windshield in any desired longitudinal position, but the jaws are preferably clamped to the left-hand end of the upper frame 14.

The movable portion of the windshield cleaner comprises a U-shaped rod having a wiper arm 21 located in front of the windshield and an operating handle 22 located behind the windshield. The arm 21 and the handle 22 are joined by an integral intermediate horizontal section 23 which is mounted to rotate within a pair of alined apertures in the jaws 12 and 13 at a point midway between bolts 15 and 16. The wiper arm 21 comprises a metal rod, preferably circular in cross section, having a downwardly extending section 24 and a laterally extending section 25. The laterally extending section 25 is not parallel to the windshield 10 but is disposed at a slight angle thereto, as shown in Fig. 2, and has a short end section 26 bent inwardly toward the windshield 10.

In order to support a rubber wiping strip 30 against the windshield, the wiper arm 21 is provided with a pair of U-shaped clamps 27 and 28 which are secured to an elongated wiper holder 29 in any desired manner as by rivets 31, 31. The wiper holder 29 is preferably U-shaped in cross section, and is adapted to detachably hold the rubber strip 30, so that it may be readily slid out of the wiper holder whenever it is desired to replace it with a new one.

The operating handle 22, which is located on the side of the windshield adjacent the driver, comprises an upper looped section 31ª, a downwardly extending section 32, a laterally extending section 33 and a lower curved hook 34. A spiral wire compression spring 35 is coiled about the intermediate section 23 of the U-shaped rod, and bears against the jaw 12 and the looped section 31ª of the operating handle 22. One end 36 of the compression spring enters an aperture in the upper part of the jaw 12, while the other end of the spring is provided with a straight section 37 and a looped section 38 engaging under the laterally extending section 33 of the operating arm 22. The spring 35 has the double function of pressing the wiper strip tightly against the front of the windshield and of automatically causing the wiper to return to its normal horizontal position after it has been manually operated by the driver.

An operating chain 39 is connected to an aperture in the end of the hook 34, and may be secured to the steering wheel, a pedal, or—as herein illustrated—to the dash board of the automobile. The horizontal intermediate section 23 is provided—in front of the jaw 13—with a washer 40 held in place against the compression of the spring 35, by a cotter pin 41.

It will thus be seen that the operating handle is so arranged that it may be manipulated directly by the hand of the driver or it may be operated through the chain 39 which is located in a more convenient position to permit the driver to clean the windshield without reaching as far as the handle 22.

In operation, when it is desired to clean the windshield, the driver will pull the chain 39 down in a clockwise direction until it has swung through an arc of about ninety degrees. The driver will then release the chain, whereupon the spring 35 will return the wiper arm 21 and the operating handle 22 to their original normal positions as shown in Fig. 3. During this automatic return motion of the device, the wiper will sweep over the front of the glass of the windshield once more, insuring a more effective cleaning thereof. By means of this construction, it will be impossible for the wiper to remain in a position on the windshield which would obstruct the vision of the driver.

While there has been disclosed in this specification, one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a windshield cleaner, a rotary wiper mounted on the windshield of an automobile and adapted to swing in an arc in front of the driver, a handle for said rotary wiper, pulling means secured to said handle and arranged within easy reach of the driver to permit the handle of the wiper to be swung across the windshield, and unitary means connected to said handle for pressing said wiper against said windshield and for automatically returning said handle to its original position after it has been swung down in front of the driver to clean the windshield.

2. In a windshield cleaner, a wiping arm, a handle connected thereto, and unitary means for resiliently pressing said wiping arm against a windshield and restoring said wiping arm and handle to normal position after the wiping arm has been swung down across the surface of the windshield.

3. In a windshield cleaner, means for wiping the front of a windshield, an operating handle located in the rear of said windshield connected with said means, and unitary means for pressing said wiping means against said windshield and for automatically restoring said wiping means to normal position after it has been swung down across the surface of the windshield.

4. In a windshield cleaner, means for wiping the front of a windshield, an operating handle located in the rear of said windshield connected with said means, and unitary means for pressing said wiping means against said windshield and for automatically restoring said wiping means to normal position after it has been swung across the surface of the windshield.

5. In a windshield cleaner, means for wiping the front of a windshield, means connected to said wiping means and located behind the windshield to permit said wiping means to be manually operated, and unitary means for pressing said wiper arm against said windshield and for returning said wiping means to normal position.

6. In a windshield cleaner, a wiping arm mounted to swing in an arc across a windshield in front of a driver of an automobile, a handle for said wiping arm, a chain secured to said handle and connected to the dash board, a spring for returning said wiper to its original position after it has been manually moved across the surface of the windshield, said spring also serving to press the wiping arm against the surface of the windshield.

7. In a windshield cleaner, a wiper mounted on the windshield of an automobile and adapted to swing in an arc in front of the driver, a handle for said rotary wiper, a chain secured to said handle and connected to the dash board, said chain being arranged within easy reach of the driver to permit him to manually swing the wiper down across the windshield from horizontal to vertical position, a spiral spring connected to said handle for pressing said wiper against said windshield, and for automatically returning it from vertical to horizontal position after it has been released.

8. In a windshield cleaner, a wiper mounted on the windshield of an automobile and adapted to swing in an arc in front of the driver, a handle for said wiper located behind the windshield, a chain secured to said handle and connected to the dash board and arranged within easy reach of the driver to permit him to manually swing the wiper down across the windshield from horizontal to vertical position, and a spring connected to said handle for pressing said wiper against said windshield, said spring also acting to return said wiper from vertical to horizontal position.

9. In a windshield cleaner, a wiper mounted on the windshield of an automobile and adapted to swing in an arc in front of the driver, a handle for said wiper, a chain secured to said handle and connected to the dash board and arranged within easy reach of the driver to permit the handle of the wiper to be swung down across the windshield from horizontal to vertical position, a spring connected to said handle for pressing said wiper against said windshield and for automatically returning said handle to its original position after it has been swung down in front of the driver to clean the windshield.

10. In a windshield cleaner, a wiper arm located in front of the windshield, an operating handle located behind said windshield and connected to said wiper arm by a horizontal intermediate section, said intermediate section being pivotally mounted in a clamp, said clamp being secured to the top of the windshield, and unitary spring means for pressing the wiper arm against the front of the windshield and restoring said wiper arm to original position after it has been operated, said handle having a hook on its end adapted to be engaged either by the hand of the driver or by pulling means for operating the same.

In testimony whereof, I have affixed my signature to this specification.

WILLIAM P. BRADY.